(12) United States Patent
Hori

(10) Patent No.: US 11,806,874 B2
(45) Date of Patent: Nov. 7, 2023

(54) ROBOT SYSTEM

(71) Applicant: FANUC CORPORATION, Yamanashi (JP)

(72) Inventor: Shintarou Hori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 154 days.

(21) Appl. No.: 17/018,345

(22) Filed: Sep. 11, 2020

(65) Prior Publication Data

US 2021/0114210 A1    Apr. 22, 2021

(30) Foreign Application Priority Data

Oct. 18, 2019    (JP) .................................. 2019-190767

(51) Int. Cl.
*B25J 9/16*    (2006.01)
*B25J 13/08*    (2006.01)
*B25J 9/04*    (2006.01)

(52) U.S. Cl.
CPC ............. *B25J 9/1633* (2013.01); *B25J 9/042* (2013.01); *B25J 9/1607* (2013.01); *B25J 13/085* (2013.01)

(58) Field of Classification Search
CPC ........ B25J 13/085; B25J 9/042; B25J 9/1607; B25J 9/1633
See application file for complete search history.

(56) References Cited

U.S. PATENT DOCUMENTS

| | | | |
|---|---|---|---|
| 7,993,289 B2* | 8/2011 | Quistgaard | A61B 34/32 601/3 |
| 9,050,719 B2* | 6/2015 | Valpola | B25J 9/1697 |
| 9,333,097 B2* | 5/2016 | Herr | A61F 2/604 |
| 9,440,353 B1* | 9/2016 | da Silva | B25J 9/1605 |
| 9,452,532 B2* | 9/2016 | Komatsu | B25J 9/1676 |
| 9,475,191 B1* | 10/2016 | Urata | B25J 9/0006 |
| 9,561,829 B1* | 2/2017 | Urata | B62D 57/032 |
| 9,592,606 B2* | 3/2017 | Rümping | B25J 9/1676 |
| 9,820,818 B2* | 11/2017 | Malackowski | A61B 34/20 |
| 2016/0016310 A1* | 1/2016 | Zhao | B25J 9/1641 327/551 |
| 2016/0375582 A1 | 12/2016 | Nakajima et al. | |
| 2019/0064782 A1 | 2/2019 | Tong | |

FOREIGN PATENT DOCUMENTS

| | | |
|---|---|---|
| JP | S61-273610 A | 12/1986 |
| JP | S63-231503 A | 9/1988 |
| JP | 2017-016228 A | 1/2017 |
| JP | 2017-205835 A | 11/2017 |
| JP | 2019-040264 A | 3/2019 |

\* cited by examiner

*Primary Examiner* — Khoi H Tran
*Assistant Examiner* — Rodney P King
(74) *Attorney, Agent, or Firm* — Renner, Otto, Boisselle & Sklar, LLP

(57) ABSTRACT

A robot system includes a robot including rotary joints to be rotated and driven about axes by a motor, and a control device that controls the motor based on external force torque about the axes that acts on each of the respective rotary joints, a force point to apply external force is preset to the robot, and the control device calculates distances from the axes of the rotary joints to the force point based on angles of the rotary joints of the robot, and adjusts and increases an operation amount to the motor as the calculated distances decrease.

5 Claims, 6 Drawing Sheets

ROBOT SYSTEM

CROSS-REFERENCE TO RELATED APPLICATIONS

This application claims the benefit of Japanese Patent Application No. 2019-190767, the content of which is incorporated herein by reference.

TECHNICAL FIELD

The present invention relates to a robot system.

BACKGROUND ART

As a teaching method of a robot, lead-through teaching (direct teaching) is known in which an operator teaches a robot while directly and manually pushing and operating the robot (e.g., see PTL 1).

The robot of PTL 1 calculates external force torque to be applied to the robot by an operator based on motor current, and controls a motor to set the external force torque to zero, based on the calculated external force torque.

CITATION LIST

Patent Literature

{PTL 1} Japanese Unexamined Patent Application, Publication No. Sho61-273610

SUMMARY OF INVENTION

An aspect of the present invention is a robot system including a robot including at least one rotary joint to be rotated and driven about an axis by a motor; and a control device that controls the motor based on external force torque about the axis that acts on the at least one rotary joint, wherein a force point to apply external force is preset to the robot, and the control device calculates a distance from the axis of the at least one rotary joint to the force point based on an angle of the at least one rotary joint of the robot, and adjusts and increases an operation amount to the motor as the calculated distance decreases.

DESCRIPTION OF EMBODIMENTS

Hereinafter, description will be made as to a robot system 1 according to an embodiment of the present invention with reference to the drawings.

Figure 1:
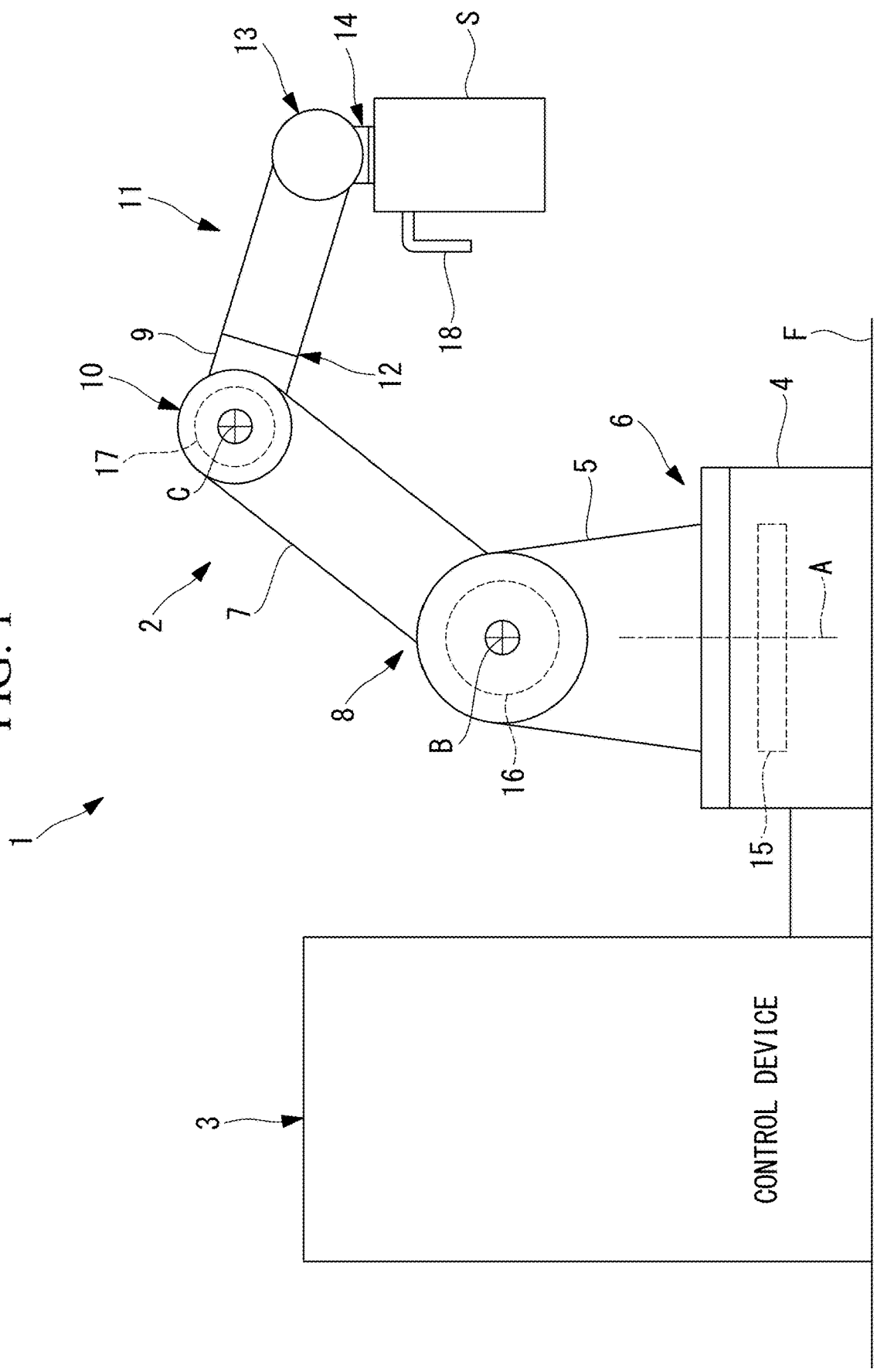
FIG. 1 is an overall configuration diagram showing a robot system according to an embodiment of the present invention.

The robot system 1 according to the present embodiment includes a robot 2 and a control device 3 as shown in FIG. 1.

The robot 2 is, for example, a vertical articulated type robot including six rotary joints, and includes a first rotary joint (a rotary joint, a first shaft) 6 including a swivel body 5 supported rotatably about a vertical first axis (a vertical axis, an axis) A to a base 4 installed on a floor surface F. Furthermore, the robot 2 includes a second rotary joint (a rotary joint, a second shaft) 8 including a first arm (an arm) 7 supported rotatably about a horizontal second axis (a horizontal axis, an axis) B to the swivel body 5.

Furthermore, the robot 2 includes a third rotary joint (a rotary joint) 10 including a second arm 9 supported rotatably about a horizontal third axis (an axis) C to the first arm 7. Furthermore, the robot 2 includes a wrist unit 11 at a tip of the second arm 9. The wrist unit 11 includes three rotary joints 12, 13, and 14.

The robot 2 includes torque sensors 15, 16, and 17, for example, between the base 4 and the swivel body 5 in the first rotary joint 6, between the swivel body 5 and the first arm 7 in the second rotary joint 8, and between the first arm 7 and the second arm 9 each of which detects external force torque applied between the base 4 and the swivel body 5, between the swivel body 5 and the first arm 7, and between the first arm 7 and the second arm 9, respectively.

Furthermore, the robot 2 has a tool S mounted thereto, the tool S including a handle (a force point) 18 gripped by an operator to apply external force, in a vicinity of a tip of the wrist unit 11.

Figure 2:
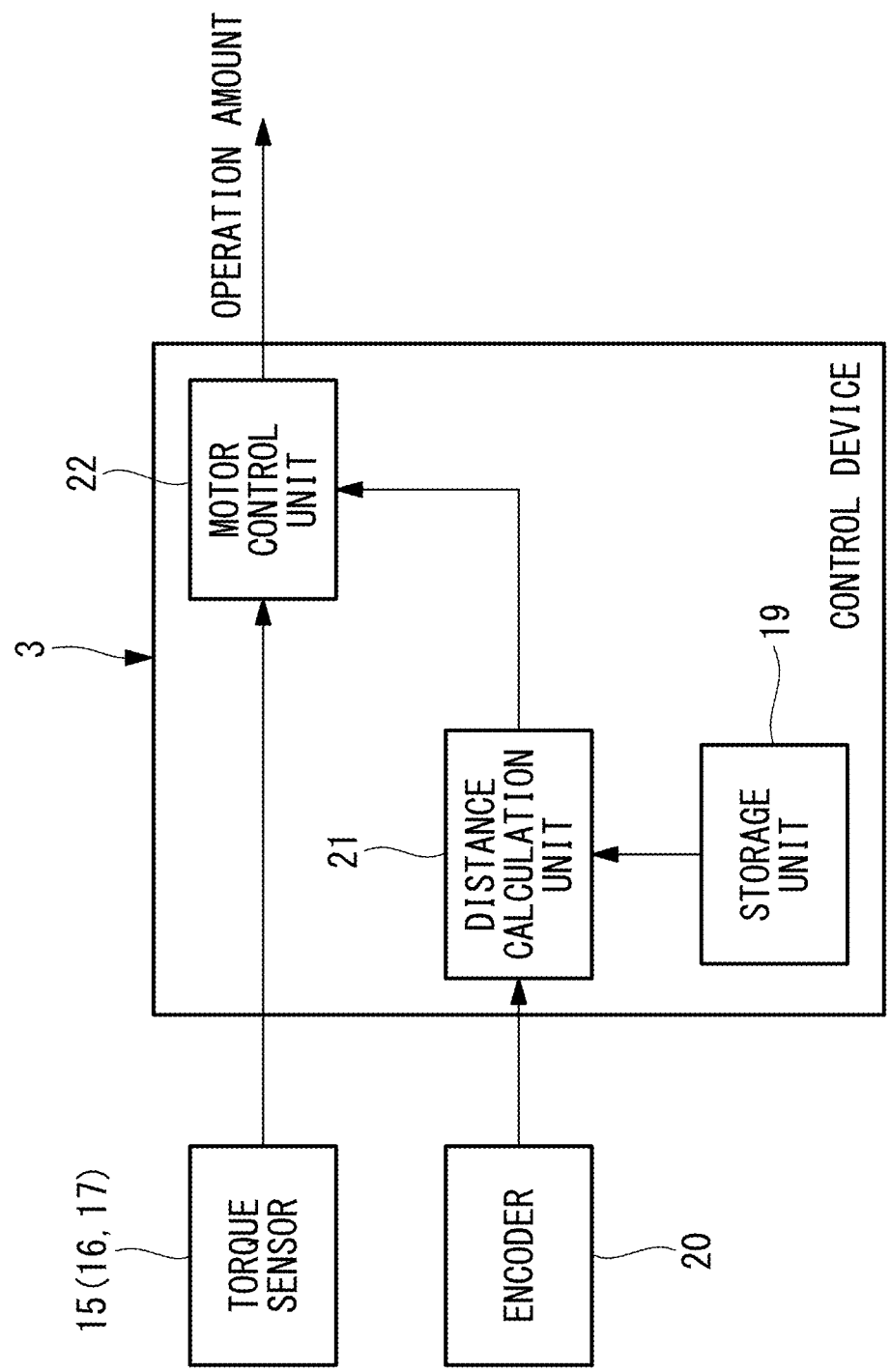
FIG. 2 is a block diagram showing a control device provided in the robot system of FIG. 1.

As shown in FIG. 2, the control device 3 includes a motor control unit 22 that controls a motor (not shown) of each of the rotary joints 6, 8, 10, 12, 13, and 14 in accordance with the detected external force torque, when the external force torque of the external force applied to the handle 18 of the tool S by the operator is detected by the torque sensors 15, 16, and 17.

Specifically, the control device 3 drives the motor of each of the rotary joints 6, 8, 10, 12, 13, and 14 in a direction in which the external force torque detected by the torque sensors 15, 16, and 17 decreases, when the external force torque acts.

In the present embodiment, the control device 3 includes a storage unit 19 that stores a shape of the tool S mounted to the tip of the wrist unit 11 of the robot 2. Furthermore, the control device 3 includes a distance calculation unit 21 that receives angle information from an encoder 20 provided in the motor of each of the rotary joints 6, 8, 10, 12, 13, and 14 and information of a shape of the tool S that is stored in the storage unit 19, and successively calculates distances from the first axis A and the second axis B to the handle 18.

Figure 3:
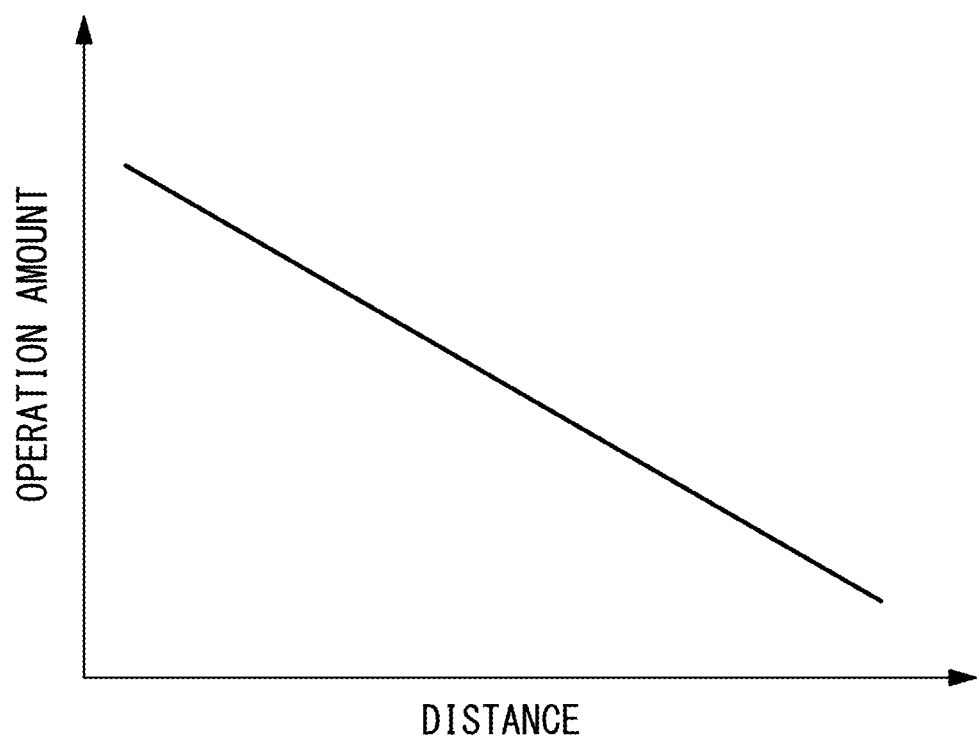
FIG. 3 is a graph showing a relation between an operation amount and a distance, the relation being adjusted by a motor control unit of the control device of FIG. 2.

Then, for example, as shown in FIG. 3, the motor control unit 22 decreases an operation amount to the motor, as the calculated distances increase.

Figure 4:
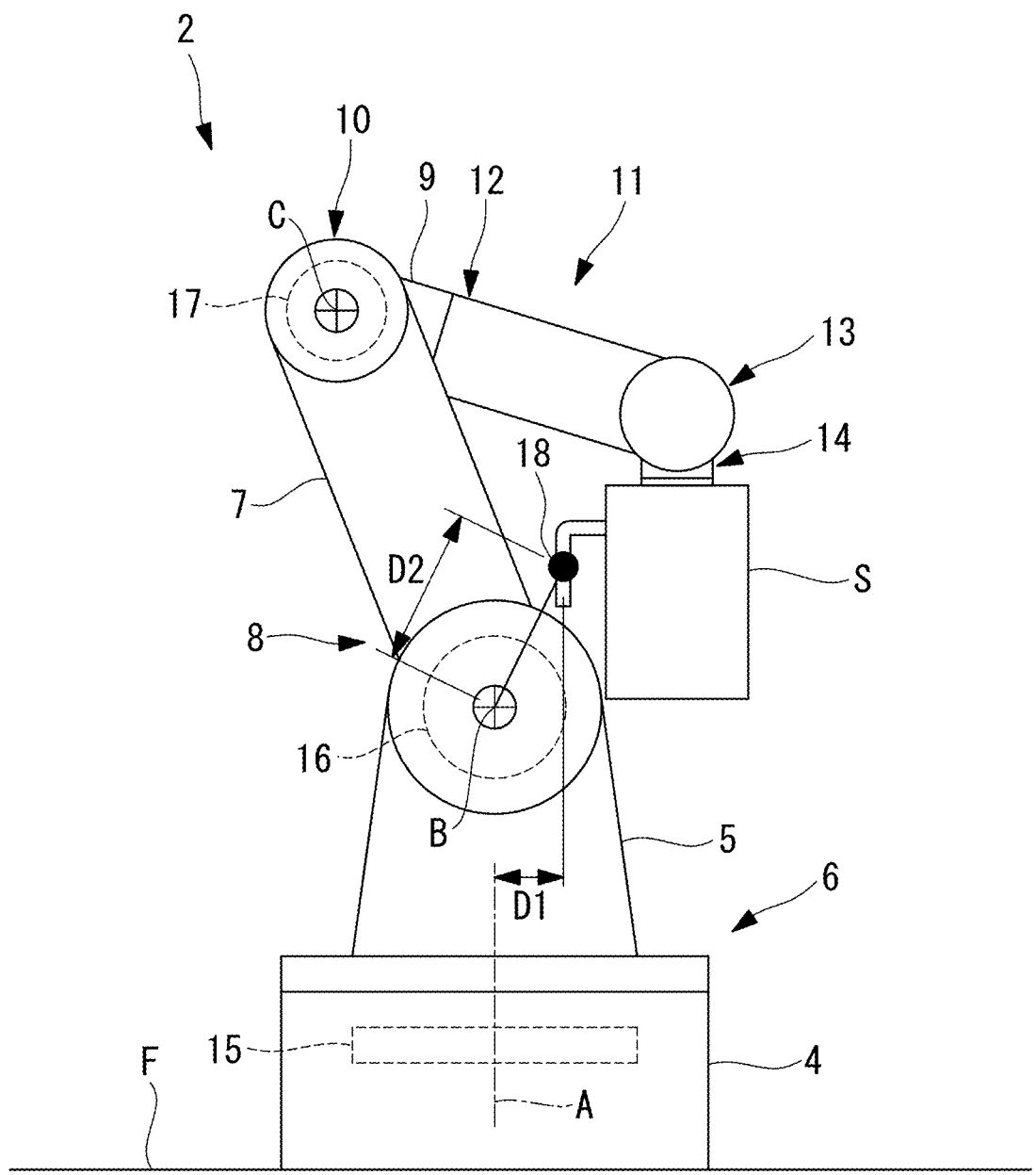
FIG. 4 is a side view of a robot showing a state where the robot of the robot system of FIG. 1 is folded to decrease distances from a first axis and a second axis to a force point of external force.
Figure 5:
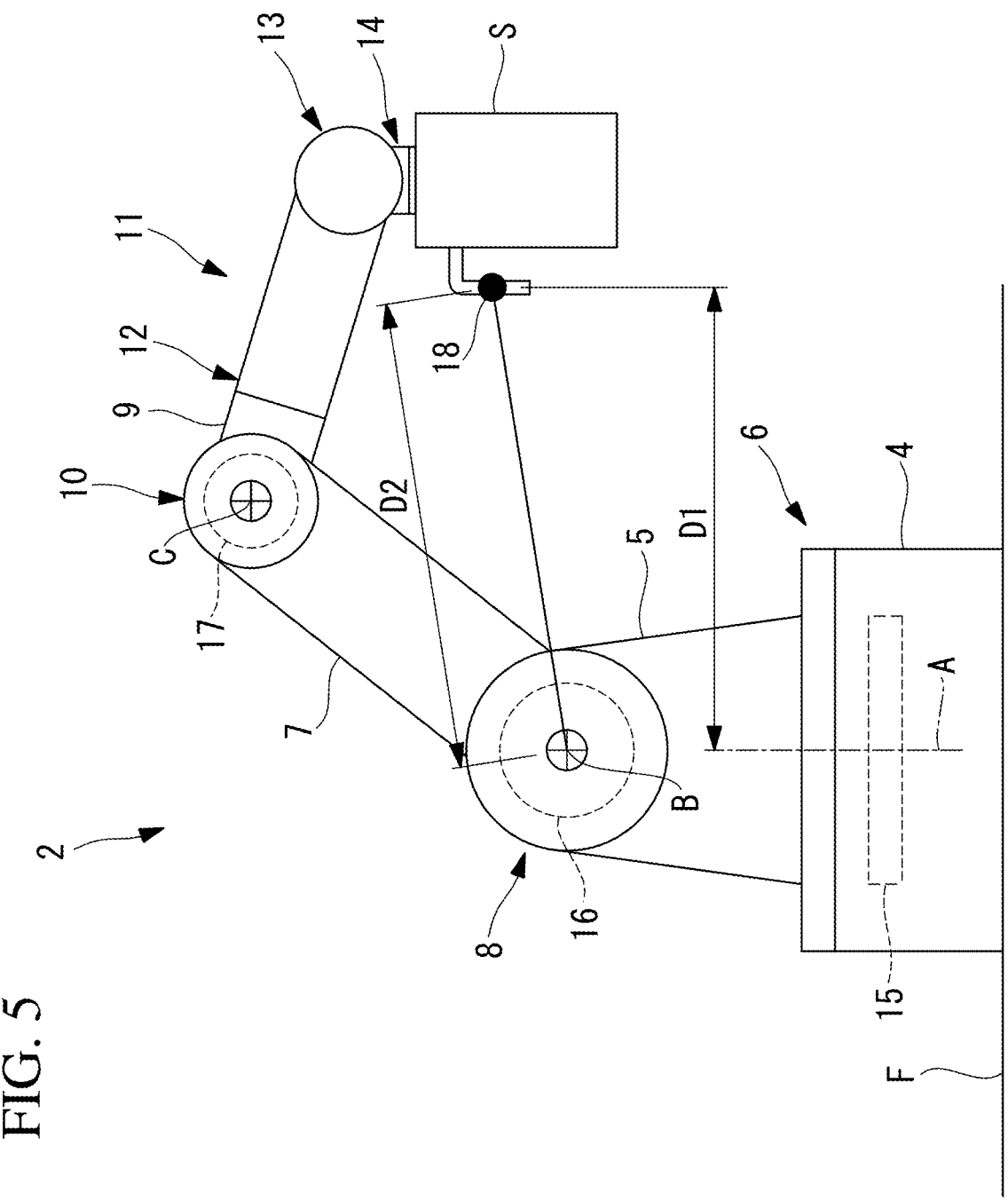
FIG. 5 is a side view of the robot showing a state where the robot of the robot system of FIG. 1 is extended to increase the distances from the first axis and the second axis to the force point of the external force.

For example, as shown in FIG. 4, in the case where the first arm 7 and the second arm 9 are folded, distances D1 and D2 from the first axis A and the second axis B to the handle 18 of the tool S decrease. On the other hand, as shown in FIG. 5, in the case where the first arm 7 and the second arm 9 are extended, the handle 18 of the tool S is disposed at a position away from the first axis A and the second axis B.

In these cases, as to a relation between the external force applied to the handle 18 and the torque, the closer the handle 18 is to the axes A and B, the smaller the external force torque detected by the torque sensors 15 and 16 becomes. Therefore, in the case where the torque to be generated by the motor is generated only based on the external force torque, if the handle 18 is closer to the axes A and B, required torque cannot be generated in the motor as long as large external force is not applied by the operator. Consequently, a burden on the operator increases.

According to the robot system 1 of the present embodiment, the operation amount to the motor is set based on a magnitude of torque detected by the torque sensors 15 and 16, and additionally, an amount of an operation commanded to the motor is increased as the distances D1 and D2 from the axes A and B to the handle 18 decrease. Consequently, irrespective of the distances D1 and D2 from the axes A and B to the handle 18, the external force to be applied to the handle 18 by the operator to generate the required torque in the motor can be almost equal.

As a result, in the case where the handle 18 is disposed at a position close to the axes A and B, there are advantages that the operator can operate the robot 2 without applying any large external force, and that the burden on the operator in performing lead-through teaching can be reduced. Furthermore, if the external force to be applied by the operator in performing the lead-through teaching is almost equal irrespective of the position of the handle 18, operability of the lead-through teaching can improve.

Note that in the present embodiment, the control device 3 is to increase the operation amount to the motor in accordance with the distances D1 and D2 from the axes A and B to the handle 18. Alternatively, the control device 3 may calculate an actual inertia amount of the robot 2 and the tool S based on a shape and weight of each part of the robot 2 and a shape and weight of the tool S mounted to the tip of the wrist unit 11, and may increase the operation amount to the motor as the calculated inertia amount decreases.

Furthermore, in the present embodiment, the force point is set to the handle 18 provided in the tool S, and the distance calculation unit 21 calculates the distances D1 and D2 from the first axis A and the second axis B to the handle 18, but the present invention is not limited thereto. The distance calculation unit 21 may calculate a distance to a point that is farthest from the axes A and B and to which the operator can physically apply the external force, or may calculate a distance to, for example, a position of a tip point of the wrist unit 11 or a center of the wrist unit 11 that is assumed as the force point.

Additionally, in the present embodiment, the distances D1 and D2 from the first axis A and the second axis B to the handle 18 are calculated. Alternatively, distances from axes of the other rotary joints 10, 12, 13, and 14 may be calculated, and the operation amount to the motor of each of the rotary joints 10, 12, 13, and 14 may be controlled to increase as the distances decrease.

Figure 6:
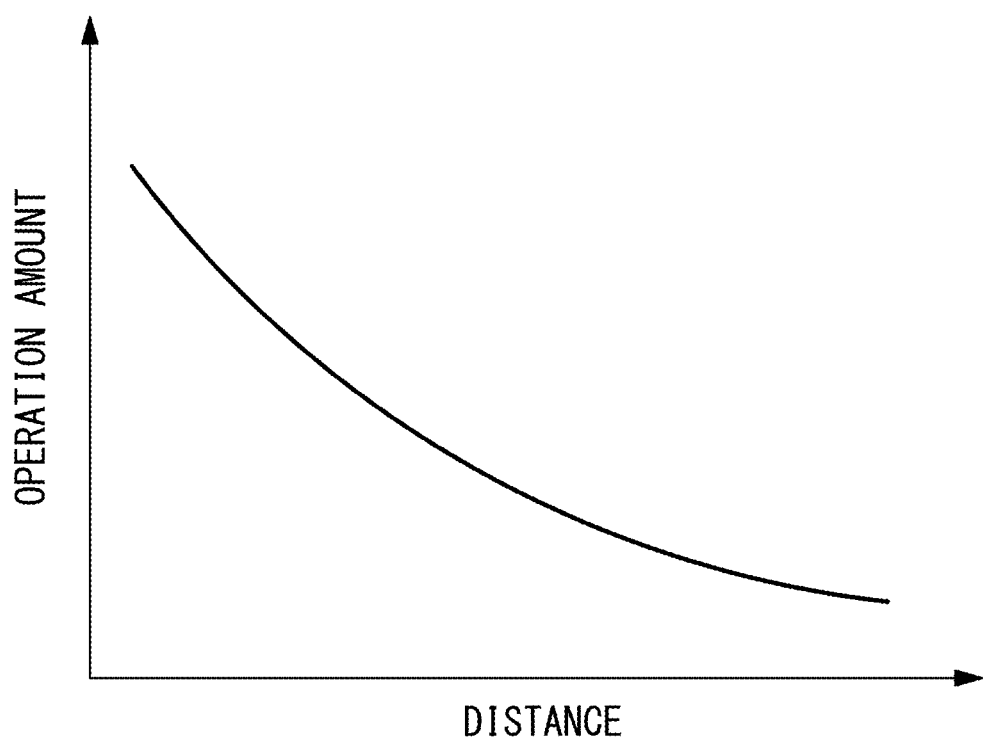
FIG. 6 is a graph showing another example of the graph of FIG. 3.

Furthermore, in the present embodiment, the operation amount to the motor linearly decreases as the distances D1 and D2 from the respective axes A and B to the handle 18 increase. Alternatively, the operation amount may be decreased along an arbitrary curve, as shown in FIG. 6.

Additionally, the 6-axes articulated type robot has been illustrated and described, but an aspect of the robot 2 is not limited thereto.

REFERENCE SIGNS LIST

1 robot system
2 robot
3 control device
4 base
5 swivel body
6 first rotary joint (a rotary joint, and a first shaft)
7 first arm (an arm)
8 second rotary joint (a rotary joint, and a second shaft)
10 third rotary joint (a rotary joint)
12, 13, and 14 rotary joint
18 handle (a force point)
A first axis (a vertical axis or an axis)
B second axis (a horizontal axis or an axis)
C third axis (an axis)
F floor surface

The invention claimed is:

1. A robot system comprising:
a robot that includes a rotary joint to be rotated and driven about an axis by a motor;
a handle that is provided on the robot and to which a force is applied;
an encoder that detects an angle of the rotary joint;
a torque sensor that detects a torque about the axis acting on the rotary joint due to the force applied to the handle; and
a controller that determines, based on the torque detected by the torque sensor, a first operation amount with which the motor is driven,
wherein the controller:
calculates, based on the angle of the rotary joint detected by the encoder, a distance between a position where the handle is provided and the axis;
determines a second operation amount in which the first operation amount is adjusted so that the second operation amount is more increased than the first operation amount as the calculated distance decreases; and
drives the motor with the second operation amount.

2. A robot system comprising:
a robot that includes a rotary joint to be rotated and driven about an axis by a motor;
a handle that is provided on the robot and to which a force is applied;
an encoder that detects an angle of the rotary joint;
a torque sensor that detects a torque about the axis acting on the rotary joint due to the force applied to the handle; and
a controller that previously stores a shape and weight of the robot and that determines, based on the torque detected by the torque sensor, a first operation amount with which the motor is driven,
wherein the controller:
calculates, based on the angle of the rotary joint detected by the encoder and the stored shape and weight, an inertia amount of the robot due to the force applied to the handle;
determines a second operation amount in which the first operation amount is adjusted so that the second operation amount is more increased than the first operation amount as the calculated inertia amount decreases; and
drives the motor with the second operation amount.

3. The robot system according to claim 1, wherein: the robot comprises:
a base installed on a floor surface;
a swivel body that is connected to the base by the rotary joint and that rotates about a vertical axis;
an arm that is connected to the swivel body by the rotary joint and that rotates about a horizontal axis;

a wrist unit that is connected to the arm; and a tool that is mounted in a vicinity of a tip of the wrist unit, and the handle is provided on the tool.

4. A controller controlling a robot that includes a rotary joint to be rotated and driven about an axis by a motor, comprising:

at least one memory; and at least one processor, wherein the at least one processor is configured to:

determine, based on a torque about the axis acting on the rotary joint due to a force applied to a handle provided on the robot, a first operation amount with which the motor is driven;

calculate, based on an angle of the rotary joint, a distance between a position where the handle is provided and the axis;

determine a second operation amount in which the first operation amount is adjusted so that the second operation amount is more increased than the first operation amount as the calculated distance decreases; and drive the motor with the second operation amount.

5. A controller controlling a robot that includes a rotary joint to be rotated and driven about an axis by a motor, comprising:

at least one memory that stores a shape and weight of the robot; and at least one processor, wherein the at least one processor is configured to:

determine, based on a torque about the axis acting on the rotary joint due to a force applied to a handle provided on the robot, a first operation amount with which the motor is driven;

calculate, based on an angle of the rotary joint and the stored shape and weight, an inertia amount of the robot due to the force applied to the handle;

determine a second operation amount in which the first operation amount is adjusted so that the second operation amount is more increased than the first operation mount as the calculated inertia amount decrease; and drive the motor with the second operation amount.

\* \* \* \* \*